United States Patent
Cho (10) Patent No.: US 9,218,072 B2
(45) Date of Patent: Dec. 22, 2015

(54) MULTI-TIP STYLUS

(71) Applicant: DOTTED DESIGN COMPANY, Taipei (TW)

(72) Inventor: Hsuan-Fu Cho, Taipei (TW)

(73) Assignee: DOTTED DESIGN COMPANY, Taipei (TW)

( * ) Notice: Subject to any disclaimer, the term of this patent is extended or adjusted under 35 U.S.C. 154(b) by 204 days.

(21) Appl. No.: 13/904,178

(22) Filed: May 29, 2013

(65) Prior Publication Data

US 2013/0321354 A1 Dec. 5, 2013

(30) Foreign Application Priority Data

May 31, 2012 (TW) .............................. 101210449 U (51) Int. Cl.
*G06F 3/0354* (2013.01)
(52) U.S. Cl.
CPC .................................. *G06F 3/03545* (2013.01)
(58) Field of Classification Search
CPC .................................................. G06F 3/03545
USPC .......................................................... 345/179
See application file for complete search history.

(56) References Cited

U.S. PATENT DOCUMENTS

| 2005/0057535 A1* | 3/2005 | Liu | ...................... G06F 3/03545 345/179 |
| 2009/0231275 A1* | 9/2009 | Odgers | .......................... 345/157 |
| 2012/0194457 A1* | 8/2012 | Cannon | ................... A63F 13/02 345/173 |

* cited by examiner

*Primary Examiner* — Kathy Wang-Hurst
*Assistant Examiner* — Peijie Shen
(74) *Attorney, Agent, or Firm* — patenttm.us (57) ABSTRACT

A multi-tip stylus has a penholder and multiple tips longitudinally mounted on the penholder and mutually spaced apart. Any adjacent two of the tips form a tip-combined stroke set. When the multi-tip stylus is operated, the penholder is held horizontally for adjacent two of the tips on the penholder to contact the touch panel. A continuous stroke can be formed by using the two adjacent tips to contact a touch panel and collaborating corresponding charcoal sketching software. Accordingly, the multi-tip stylus can be operated in a similar way of holding a charcoal crayon and drawing with the charcoal crayon as in a traditional charcoal sketch so as to do the traditional charcoal sketching techniques, such as shading, blending, toning, and the like.

11 Claims, 11 Drawing Sheets

MULTI-TIP STYLUS

BACKGROUND OF THE INVENTION

1. Field of the Invention

The present invention relates to a stylus for inputting information on a touch panel and, more particularly, to a multi-tip stylus simulating the way of holding and operating a charcoal crayon.

2. Description of the Related Art

Charcoal crayon is usually used as a drawing tool in traditional sketch, and is made by willow branches of short lengths. Any part of a charcoal crayon is useful for drawing. Not only is the tip of a charcoal crayon good for drawing lines, but also all sides of the charcoal crayon can be used for charcoal drawing techniques, such as shading, blending, toning and the like. When a charcoal crayon is used to tone a background of a paper having blocks of different shades, sides of the charcoal crayon can be used for toning. Depending on the size of the block to be toned, a charcoal crayon with a desired length is selected. A longer charcoal crayon is more appropriate for uniformly toning a larger area while a shorter charcoal crayon is more appropriate for toning a smaller area and for creating strokes.

To keep abreast of technological advancement, portable electronic devices are also equipped with application programs for simulating charcoal sketch for user to directly make a sketch on a touch panel without being limited by place, space and tool for creating the sketch. As a result, more and more sketchers choose to make sketches on portable electronic devices. However, the charcoal sketching tools for creating sketches in the conventional application programs installed in portable electronic devices pertain to a type of single-tip stylus. When making a charcoal sketch with the conventional application programs, users need to select different stroke thickness to achieve the desired line weight. As wider stroke thickness is required to tone the background of a paper on a touch panel, users need to repeatedly tone each block to be toned with the tip of the single-tip stylus. Since the ways of holding a stylus and toning in the charcoal sketching application programs dramatically differ from those of holding a charcoal crayon and toning in the traditional charcoal sketch, many sketchers familiar with the traditional charcoal sketch, who are not accustomed to making sketches on touch panels, need to change their sketching habits that have been shaped in years of experience.

SUMMARY OF THE INVENTION

An objective of the present invention is to provide a multi-tip stylus used as a drawing tool for drawing on a touch panel and simulating the way of holding a traditional charcoal crayon and using the charcoal crayon to do traditional charcoal sketch.

To achieve the foregoing objective, the multi-tip stylus has a penholder and multiple tips.

The penholder has two ends.

The tips are mounted on the penholder along a longitudinal direction of the penholder, and are mutually spaced apart.

Preferably, an imaginary line is tangent to two of the tips and not tangent to any other tip.

Preferably, the multi-tip stylus further has multiple curved sections and multiple protrusions.

The curved sections are sequentially connected in a longitudinal direction to form the penholder.

The protrusions are respectively formed connected between each adjacent two of the curved sections and formed on the two ends of the penholder. The tips are respectively mounted on the protrusions.

Preferably, the protrusions protrude to align in different lateral directions of the penholder.

Preferably, the curved sections are a first curved section, a second curved section, a third curved section, and a fourth curved section. Each curved section has two ends. The two ends of the second curved section are respectively connected with one end of the first curved section and one end of the third curved section that is adjacent to the second curved section, and the other end of the third curved section is connected with one end of the fourth curved section that is adjacent to the third curved section. One of the two ends of the first curved section and one of the two ends of the fourth curved section are each respectively a free end.

Preferably, the tips are a first tip, a second tip, a third tip, a fourth tip, and a fifth tip. The first tip is formed on and protrudes from a tip of the free end of the first curved section, the second tip is connected between the first curved section and the second curved section, the third tip is connected between the second curved section and the third curved section, the fourth tip is connected between the third curved section and the fourth section, and the fifth tip is formed on a tip of the free end of the fourth curved section.

Preferably, the fourth curved section is longer than the third curved section, the third curved section is longer than the second curved section, and the second curved section is longer than the first curved section.

Preferably, the first tip and the second tip form a first tip-combined stroke set, the first tip and the third tip form a second tip-combined stroke set, the first tip and the fourth tip form a third tip-combined stroke set, the first tip and the fifth tip form a fourth tip-combined stroke set, the second tip and the third tip form a fifth tip-combined stroke set, the second tip and the fourth tip form a sixth tip-combined stroke set, the third tip and the fifth tip form a seventh tip-combined stroke set, and the fourth tip and the fifth tip form an eighth tip-combined stroke set.

Given the foregoing technical measure, the multi-tip stylus simulates the ways of holding and using a traditional charcoal crayon, i.e. holding the charcoal crayon horizontally and making sketches with sides of the charcoal crayon. Any two of the tips are used in collaboration with drawing software to contact a touch panel in generation of a corresponding and continuous stroke between the two tips, thereby performing traditional charcoal drawing techniques, such as shading, blending, toning and the like, and toning a background of a paper having blocks of different shades. Accordingly, sketchers who are familiar with traditional charcoal sketching techniques can create sketches on a touch panel with the charcoal sketching techniques without changing their original sketching habit. As the distance between two tips on a touch panel corresponds to a stroke thickness, depending on the size of the block to be toned, a tip-combined stroke set corresponding to a distance between two of the tips for generating strokes with a desired thickness can be selected by users. Naturally, strokes with different thickness can be presented without adjusting stroke thickness through the drawing software. The multi-stylus can be used to make charcoal sketches in a more intuitive and real sketching means.

Other objectives, advantages and novel features of the invention will become more apparent from the following detailed description when taken in conjunction with the accompanying drawings.

DETAILED DESCRIPTION OF THE INVENTION

With reference to FIGS. 1 to 4, a multi-tip stylus in accordance with the present invention has a penholder 10 and multiple tips.

The penholder 10 is a metal stick, and has multiple curved sections. The curved sections are sequentially connected in a longitudinal direction to form the penholder 10. In the present embodiment, the penholder 10 has four curved sections, sequentially, a first curved section 11, a second curved section 12, a third curved section 13, and a fourth curved section 14, and multiple protrusions, sequentially, a first protrusion 15, a second protrusion 16, a third protrusion 17, a fourth protrusion 18, and a fifth protrusion 19. The fourth curved section 14 is longer than the third curved section 13. The third curved section 13 is longer than the second curved section 12. The second curved section 12 is longer than the first curved section 11. Each of the curved sections has two ends. The two ends of the second curved section 12 are respectively connected with one end of the first curved section 11 and one end of the third curved section 13 that is adjacent to the second curved section 12. The other end of the third curved section 13 is connected with one end of the fourth curved section 14 that is adjacent to the third curved section 13. One of the two ends of the first curved section and one of the two ends of the fourth curved section are each respectively a free end. The first protrusion 15 is formed on and protrudes from a tip of the free end of the first curved section 11. The second protrusion 16 is connected between the first curved section 11 and the second curved section 12. The third protrusion 17 is connected between the second curved section 12 and the third curved section 13. The fourth protrusion 18 is connected between the third curved section 13 and the fourth section 14. The fifth protrusion 19 is formed on a tip of the free end of the fourth curved section 14. The first protrusion 15, the second protrusion 16, the third protrusion 17, the fourth protrusion 18, and the fifth protrusion 19 protrude to align in different lateral directions of the penholder 10.

The tips are made of conductive rubber. In the present embodiment, the multi-tip stylus has five tips, sequentially, a first tip 21, a second tip 22, a third tip 23, a fourth tip 24, and a fifth tip 25. The first tip 21 is mounted on the first protrusion 15. The second tip 22 is mounted on the second protrusion 16.
The third tip 23 is mounted on the third protrusion 17. The fourth tip 24 is mounted on the fourth protrusion 18. The fifth tip 25 is mounted on the fifth protrusion 19.

The tips are mounted on the penholder 10 along a longitudinal direction of the penholder 10, and are mutually spaced apart. Two of the tips are selected to form one of multiple tip-combined stroke sets with an imaginary line tangent to the two selected tips and not tangent to any other tip. The imaginary line also does not pass through the penholder 10.

Figure 1:
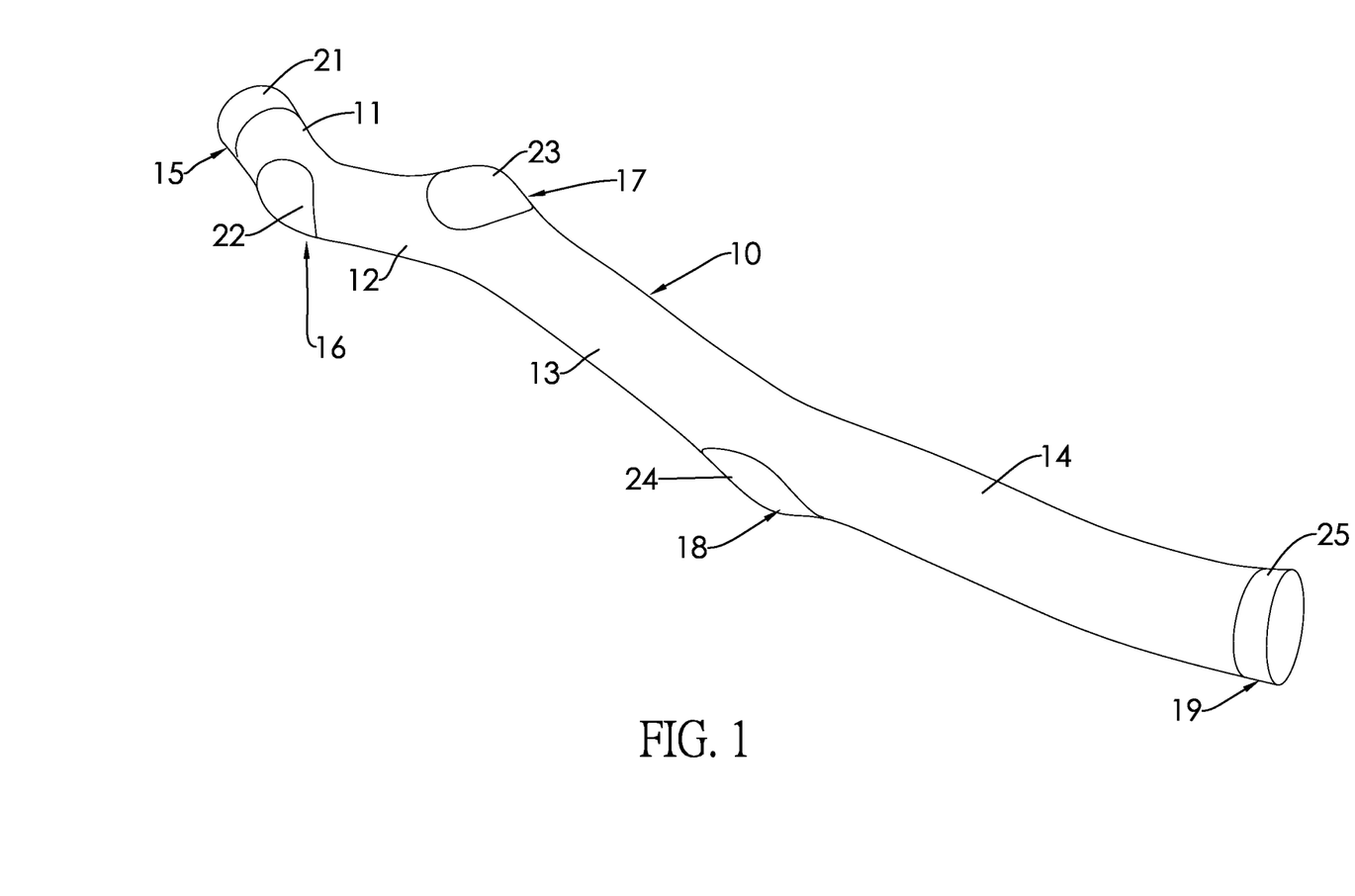
FIG. 1 is a perspective view of a multi-tip stylus in accordance with the present invention.
Figure 2:
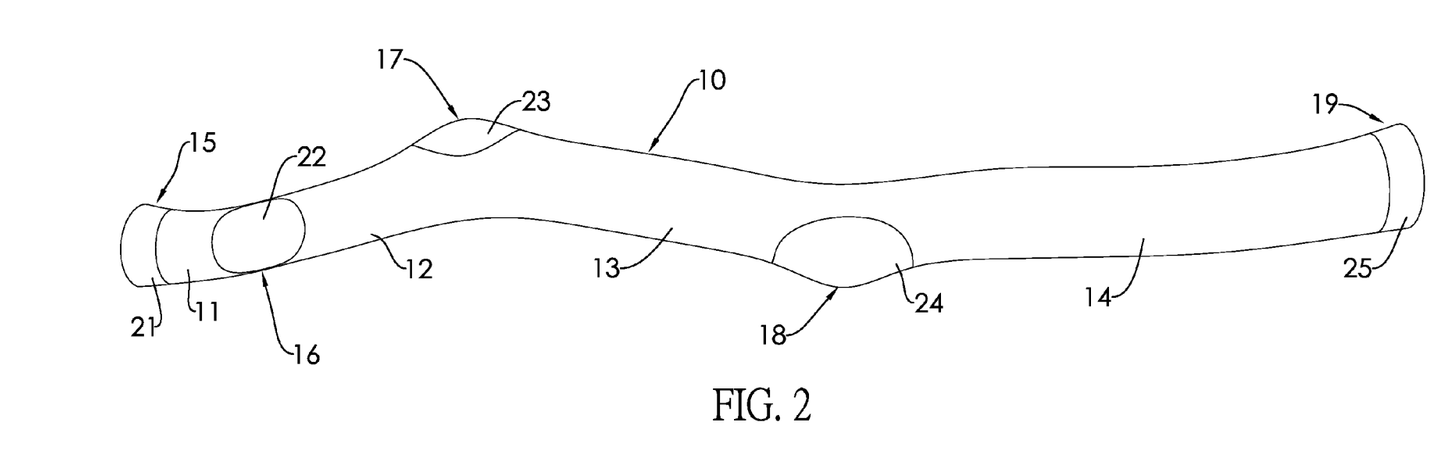
FIG. 2 is a front view of the multi-tip stylus in FIG. 1.
Figure 3:
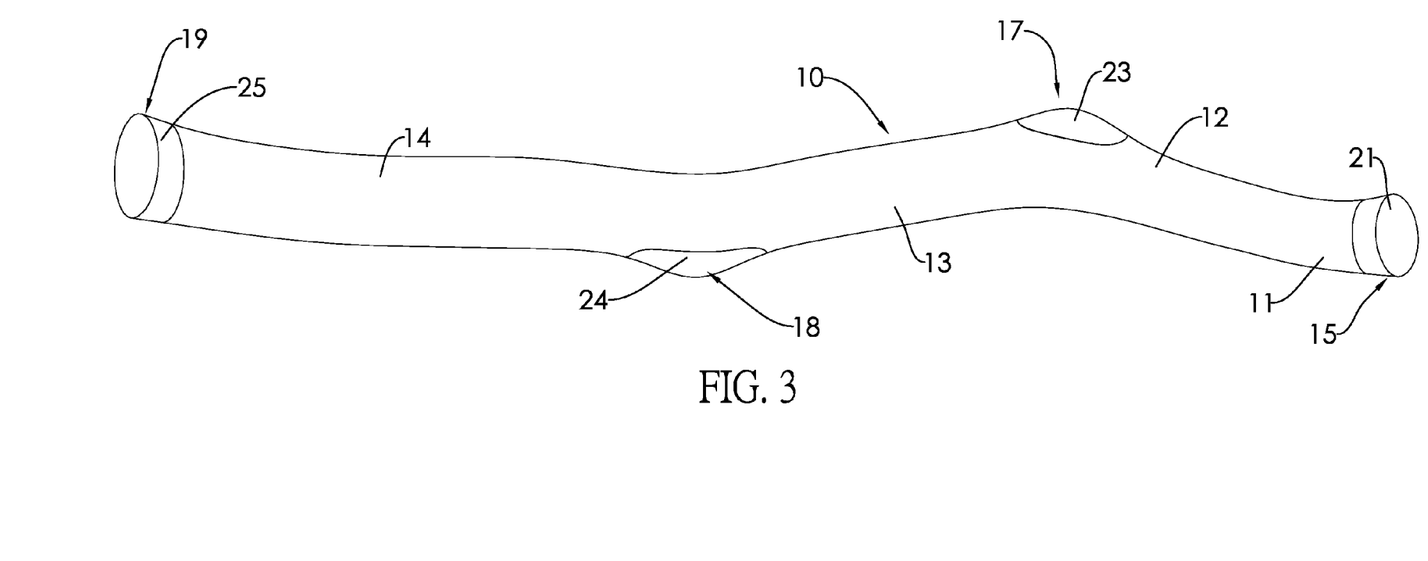
FIG. 3 is a rear view of the multi-tip stylus in FIG. 1.
Figure 4:
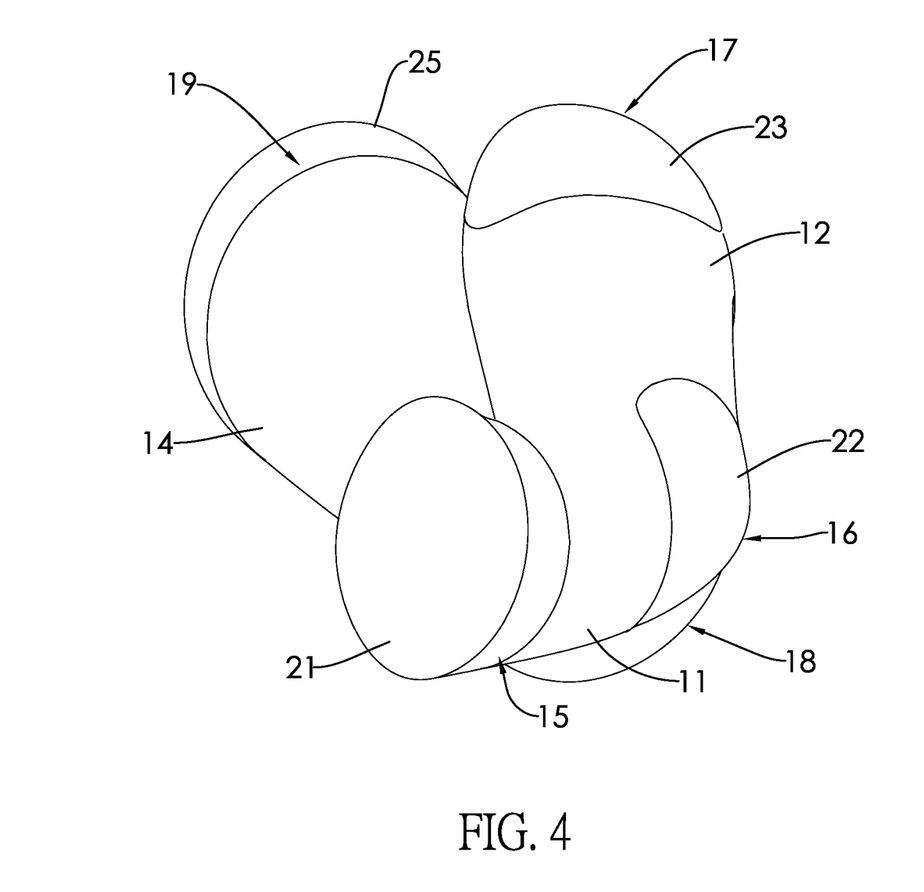
FIG. 4 is a left-side view of the multi-tip stylus in FIG. 1.
Figure 5:
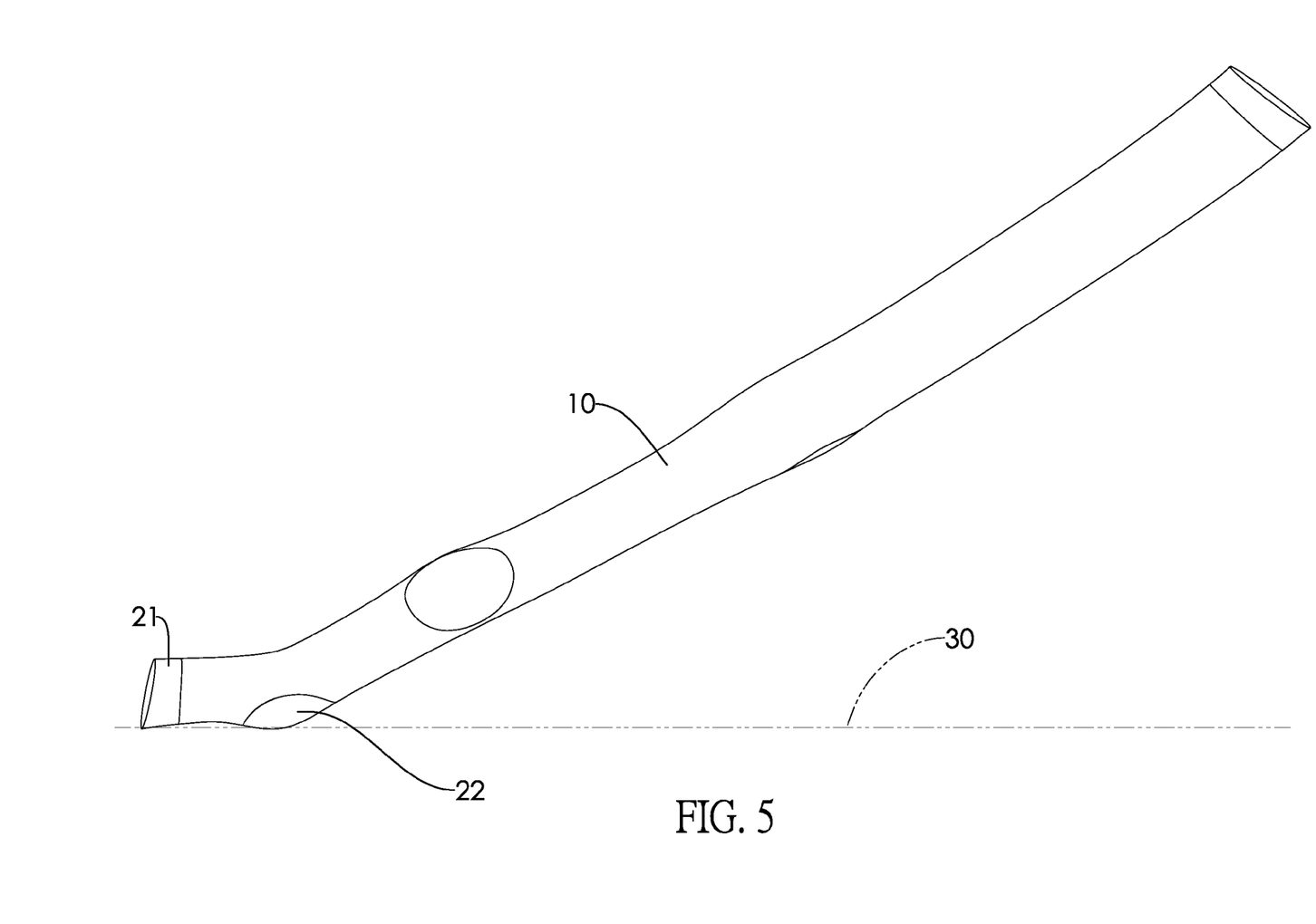
FIG. 5 is a first tip-combined stroke set of the multi-tip stylus in FIG. 1.

With reference to FIG. 5, a first imaginary line 30 is only tangent to the first tip 21 and the second tip 22 without being tangent to any other tip. The first tip 21 and the second tip 22 form a first tip-combined stroke set.

Figure 6:
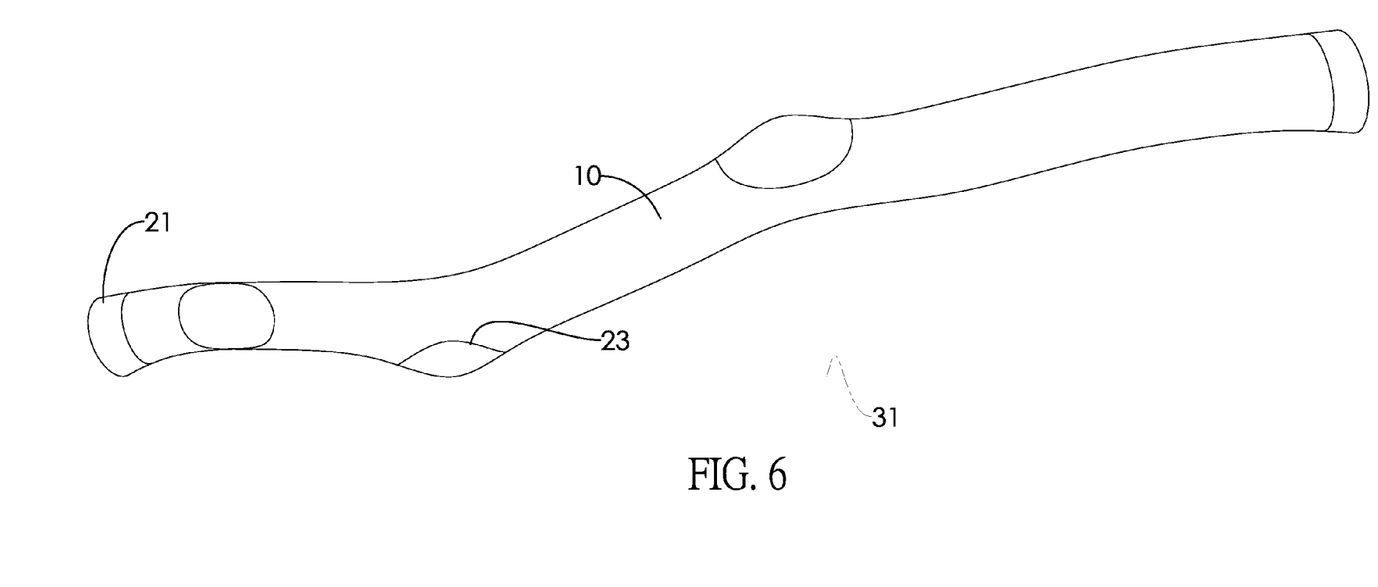
FIG. 6 is a second tip-combined stroke set of the multi-tip stylus in FIG. 1.

With reference to FIG. 6, a second imaginary line 31 is only tangent to the first tip 21 and the third tip 23 without being tangent to any other tip. The first tip 21 and the third tip 23 form a second tip-combined stroke set.

Figure 7:
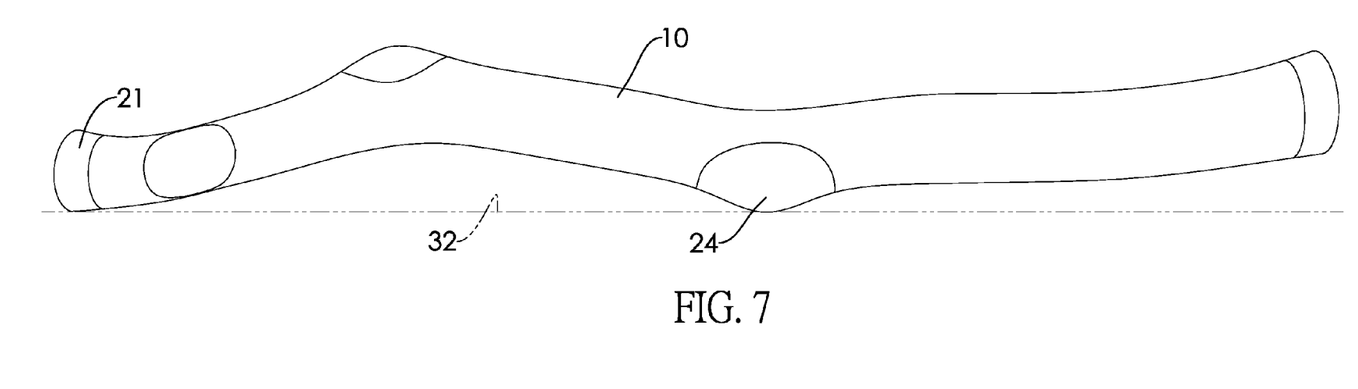
FIG. 7 is a third tip-combined stroke set of the multi-tip stylus in FIG. 1.

With reference to FIG. 7, a third imaginary line 32 is only tangent to the first tip 21 and the fourth tip 24 without being tangent to any other tip. The first tip 21 and the fourth tip 24 form a third tip-combined stroke set.

Figure 8:
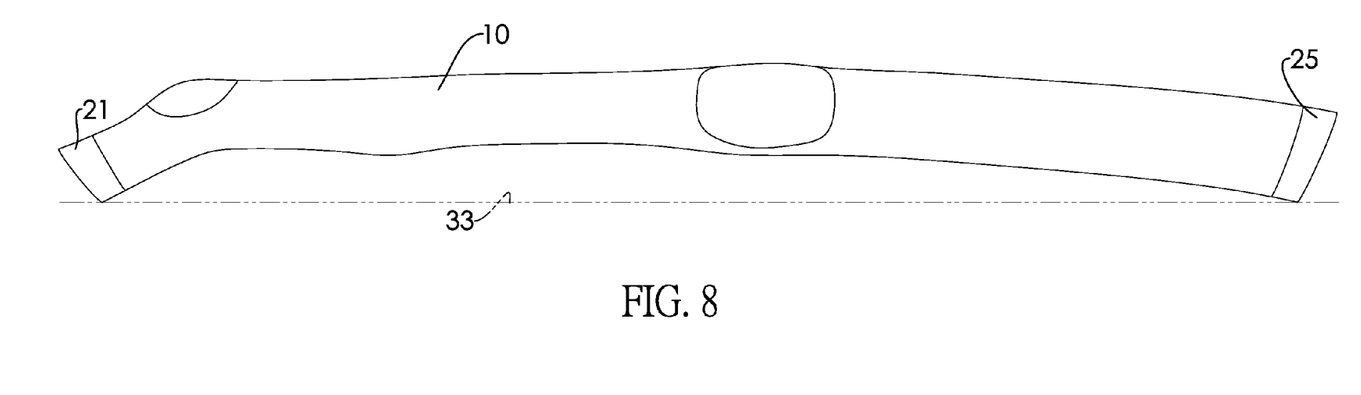
FIG. 8 is a fourth tip-combined stroke set of the multi-tip stylus in FIG. 1

With reference to FIG. 8, a fourth imaginary line 33 is only tangent to the first tip 21 and the fifth tip 25 without being tangent to any other tip. The first tip 21 and the fifth tip 25 form a fourth tip-combined stroke set.

Figure 9:
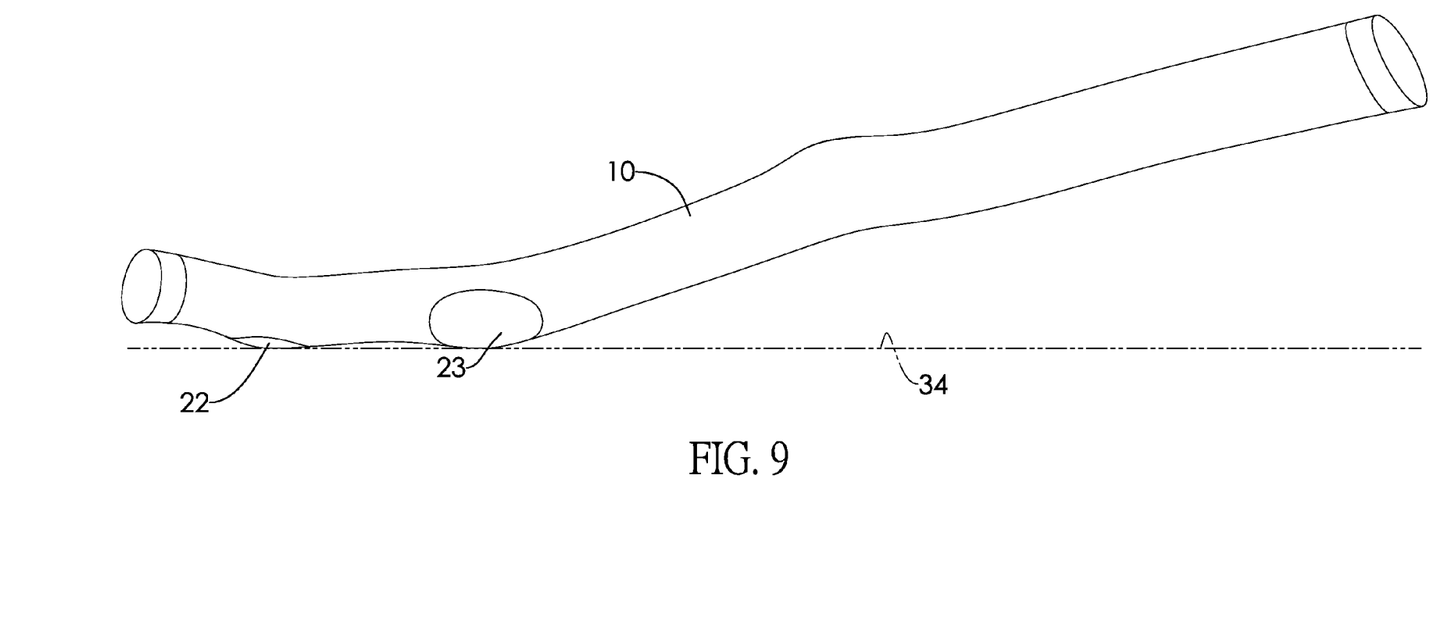
FIG. 9 is a fifth tip-combined stroke set of the multi-tip stylus in FIG. 1.

With reference to FIG. 9, a fifth imaginary line 34 is only tangent to the second tip 22 and the third tip 23 without being tangent to any other tip. The second tip 22 and the third tip 23 form a fifth tip-combined stroke set.

Figure 10:
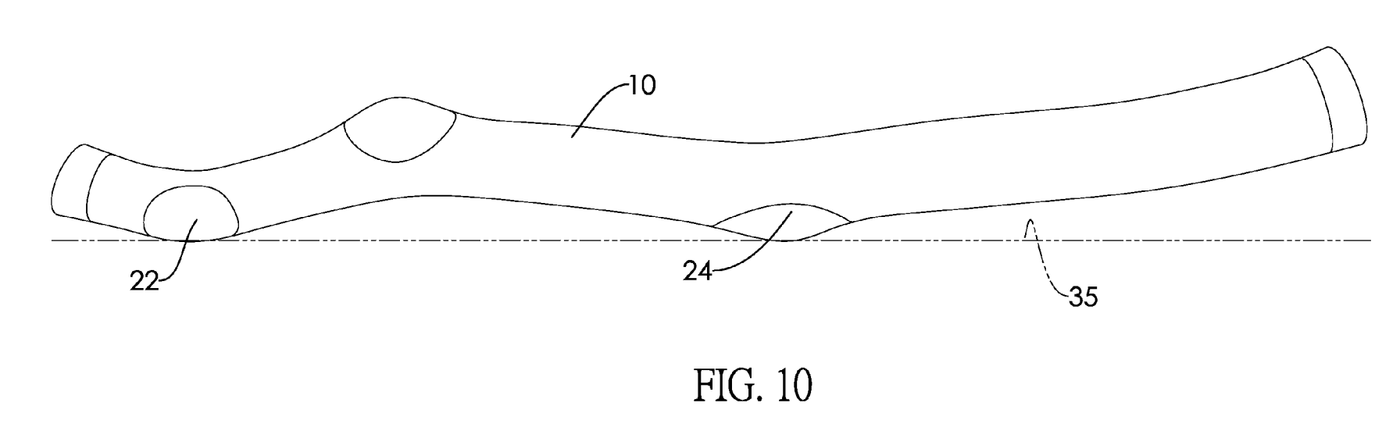
FIG. 10 is a sixth tip-combined stroke set of the multi-tip stylus in FIG. 1

With reference to FIG. 10, a sixth imaginary line 35 is only tangent to the second tip 22 and the fourth tip 24 without being tangent to any other tip. The second tip 22 and the fourth tip 24 form a sixth tip-combined stroke set.

Figure 11:
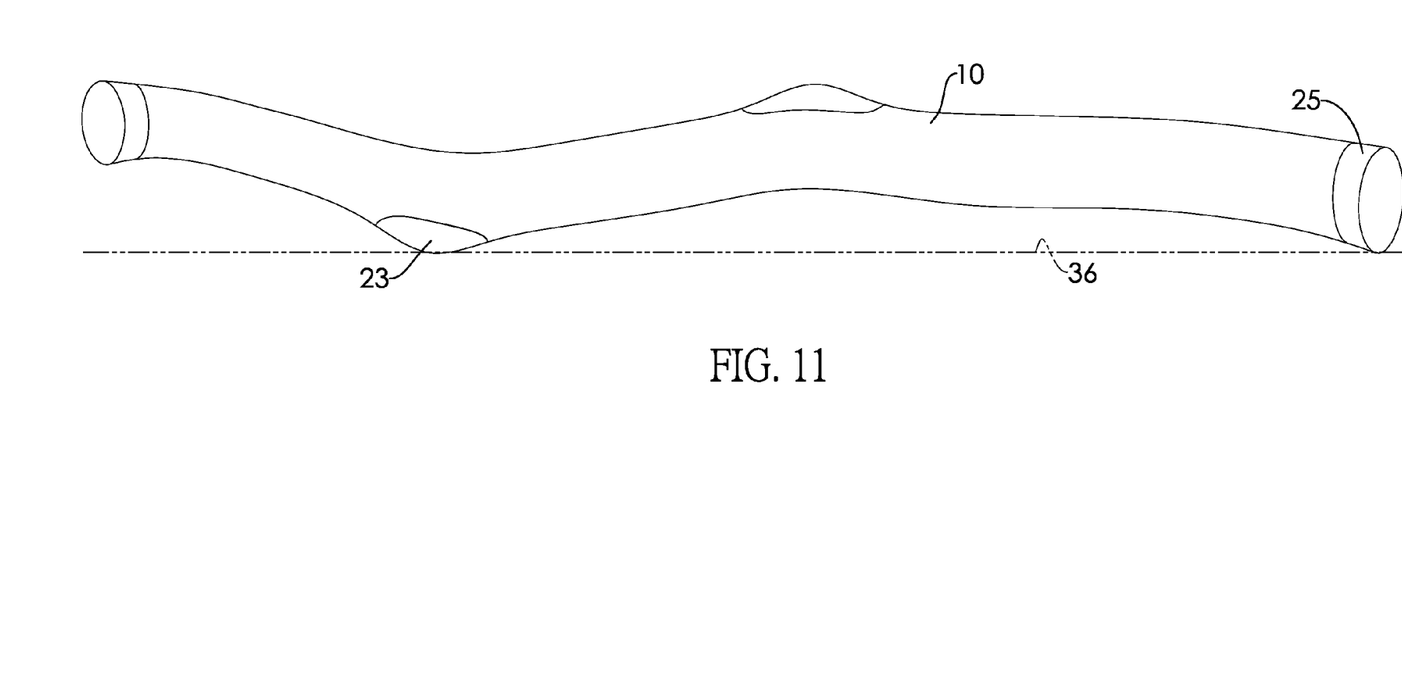
FIG. 11 is a seventh tip-combined stroke set of the multi-tip stylus in FIG. 1.

With reference to FIG. 11, a seventh imaginary line 36 is only tangent to the third tip 23 and the fifth tip 25 without being tangent to any other tip. The third tip 23 and the fifth tip 25 form a seventh tip-combined stroke set.

The fourth tip 24 and the fifth tip 25 form an eighth tip-combined stroke set.

Figure 12:
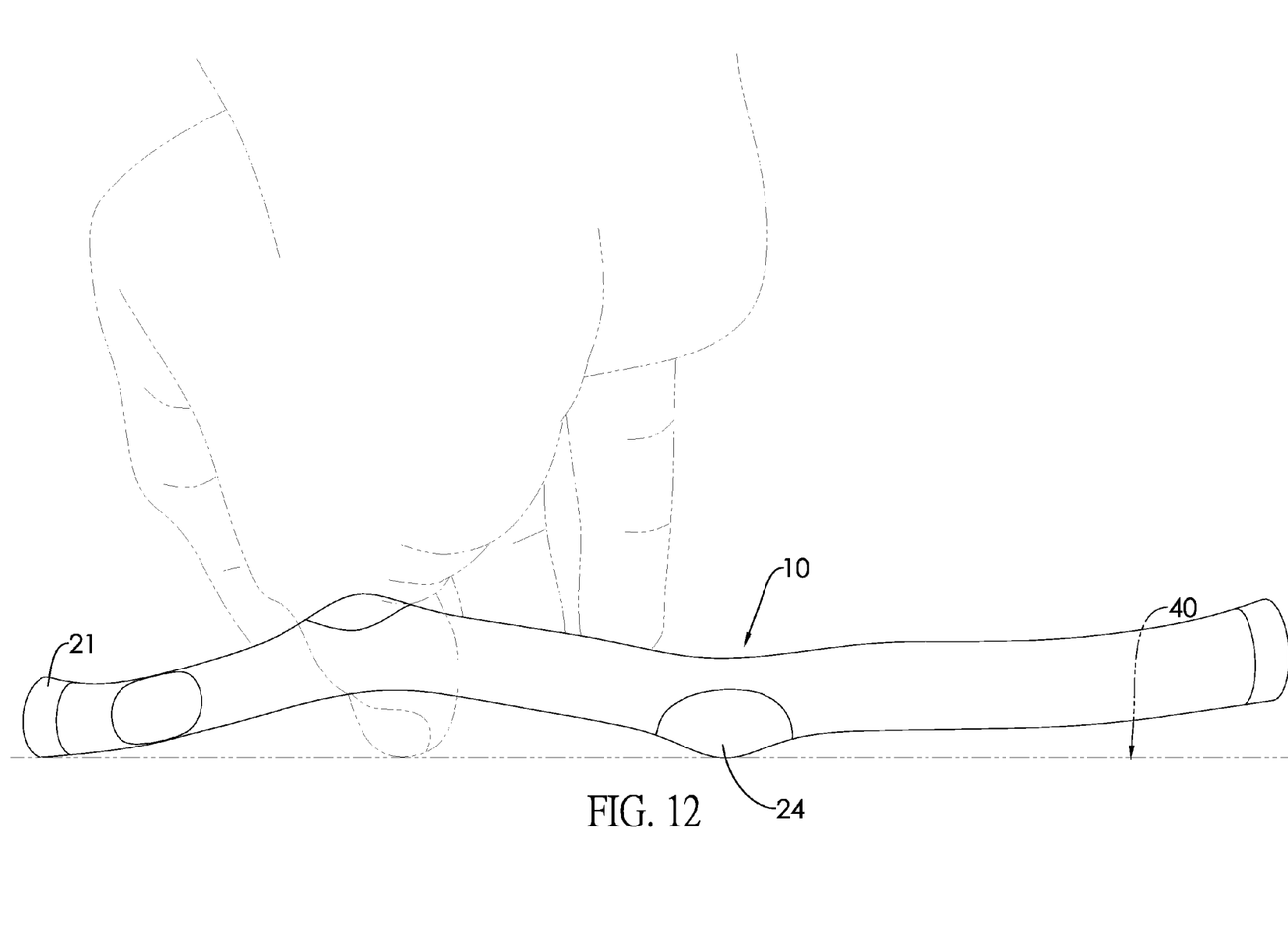
FIG. 12 is an operational perspective view of the multi-tip stylus in FIG. 1.

With reference to FIG. 12, when the multi-tip stylus is in use, users hold the multi-tip stylus in a horizontal direction. Two of the tips on the penholder 10 of a corresponding tip-combined stroke set contact a touch panel 40 of a portable electronic device. As shown in FIG. 12, the first tip 21 and the fourth tip 24 of the third tip-combined stroke set contact the touch panel 40. In collaboration with an internal setting of a charcoal sketching simulation application program in the portable electronic device, a continuous stroke can be generated between the two corresponding tips in contact with the touch panel 40. Users can move the penholder 10 to do the charcoal sketch with the sketching techniques, such as shading, toning, and the like, so as to tone a background of a paper having blocks of different shades in similar ways of holding a stylus and toning in the charcoal sketching as in traditional charcoal sketch, or draw a line on the touch panel 40 with each of the tips.

As the distance between the two tips of each tip-combined stroke set is unique from that of any other tip-combined stroke and corresponds to a particular stroke thickness, users can choose one of the tip-combined strokes according to a size of an area to be toned to generate desired stroke on the touch panel 40. The way of using the multi-tip stylus is rather intuitive and close to real charcoal sketching.

The multi-tip stylus can also employ single tip to contact the touch panel for inputting information. For example, the first tip 21 or the fifth tip 25 is used to contact the touch panel, and the ways of holding and using the multi-tip stylus are similar to holding and using conventional styluses. Accordingly, the multi-tip stylus can provide versatile operations.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A multi-tip stylus, comprising:
a penholder being stick-shaped and having two ends; and
multiple tips mounted on the penholder along a longitudinal direction of the penholder, and mutually spaced apart, wherein a distance between any two of the multiple tips is unique and corresponds to a stroke thickness for drawing a line;
multiple curved sections sequentially connected in the longitudinal direction to form the penholder; and
multiple protrusions respectively formed connected between each adjacent two of the curved sections and formed on the two ends of the penholder, wherein the tips are respectively mounted on the protrusions;
where the protrusions protrude to align in different lateral directions of the penholder.

2. The multi-tip stylus as claimed in claim 1, wherein an imaginary line is tangent to two of the tips and not tangent to any other tip.

3. The multi-tip stylus as claim in claim 1, wherein
the curved sections are a first curved section, a second curved section, a third curved section, and a fourth curved section, each curved section has two ends, the two ends of the second curved section are respectively connected with one end of the first curved section and one end of the third curved section that is adjacent to the second curved section, and the other end of the third curved section is connected with one end of the fourth curved section that is adjacent to the third curved section; wherein one of the two ends of the first curved section and one of the two ends of the fourth curved section are each respectively a free end; and
the tips are a first tip, a second tip, a third tip, a fourth tip, and a fifth tip, the first tip is formed on and protrudes from a tip of the free end of the first curved section, the second tip is connected between the first curved section and the second curved section, the third tip is connected between the second curved section and the third curved section, the fourth tip is connected between the third curved section and the fourth curved section, and the fifth tip is formed on a tip of the free end of the fourth curved section.

4. The multi-tip stylus as claimed in claim 3, wherein the fourth curved section is longer than the third curved section, the third curved section is longer than the second curved section, and the second curved section is longer than the first curved section.

5. The multi-tip stylus as claimed in claim 4 wherein the first tip and the second tip form a first tip-combined stroke set;
the first tip and the third tip form a second tip-combined stroke set;
the first tip and the fourth tip form a third tip-combined stroke set;
the first tip and the fifth tip form a fourth tip-combined stroke set;
the second tip and the third tip form a fifth tip-combined stroke set;
the second tip and the fourth tip form a sixth tip-combined stroke set;
the third tip and the fifth tip form a seventh tip-combined stroke set; and
the fourth tip and the fifth tip form an eighth tip-combined stroke set.

6. A multi-tip stylus, comprising:
a penholder having two ends; and
multiple tips mounted on the penholder along a longitudinal direction of the penholder, and mutually spaced apart,
further comprising:
multiple curved sections sequentially connected in the longitudinal direction to form the penholder; and
multiple protrusions respectively formed connected between each adjacent two of the curved sections and formed on the two ends of the penholder, wherein the tips are respectively mounted on the protrusions, wherein
the protrusions protrude to align in different lateral directions of the penholder;
the curved sections are a first curved section, a second curved section, a third curved section, and a fourth curved section, each curved section has two ends, the two ends of the second curved section are respectively connected with one end of the first curved section and one end of the third curved section that is adjacent to the second curved section, and the other end of the third curved section is connected with one end of the fourth curved section that is adjacent to the third curved section; wherein one of the two ends of the first curved section and one of the two ends of the fourth curved section are each respectively a free end; and
the tips are a first tip, a second tip, a third tip, a fourth tip, and a fifth tip, the first tip is formed on and protrudes from a tip of the free end of the first curved section, the second tip is connected between the first curved section and the second curved section, the third tip is connected between the second curved section and the third curved section, the fourth tip is connected between the third curved section and the fourth curved section, and the fifth tip is formed on a tip of the free end of the fourth curved section.

7. A multi-tip stylus, comprising:
a penholder having two ends; and
multiple tips mounted on the penholder along a longitudinal direction of the penholder, and mutually spaced apart
wherein an imaginary line is tangent to two of the tips and not tangent to any other tip,
further comprising:
multiple curved sections sequentially connected in a longitudinal direction to form the penholder; and
multiple protrusions respectively formed connected between each adjacent two of the curved sections and formed on the two ends of the penholder, wherein the tips are respectively mounted on the protrusions, wherein
the protrusions protrude to align in different lateral directions of the penholder;
the curved sections are a first curved section, a second curved section, a third curved section, and a fourth curved section, each curved section has two ends, the two ends of the second curved section are respectively connected with one end of the first curved section and one end of the third curved section that is adjacent to the second curved section, and the other end of the third curved section is connected with one end of the fourth curved section that is adjacent to the third curved section; wherein one of the two ends of the first curved section and one of the two ends of the fourth curved section are each respectively a free end; and the tips are a first tip, a second tip, a third tip, a fourth tip, and a fifth tip, the first tip is formed on and protrudes from a tip of the free end of the first curved section, the second tip is connected between the first curved section and the second curved section, the third tip is connected between the second curved section and the third curved section, the fourth tip is connected between the third curved section and the fourth curved section, and the fifth tip is formed on a tip of the free end of the fourth curved section.

8. The multi-tip stylus as claimed in claim 6, wherein the fourth curved section is longer than the third curved section, the third curved section is longer than the second curved section, and the second curved section is longer than the first curved section.

9. The multi-tip stylus as claimed in claim 7, wherein the fourth curved section is longer than the third curved section, the third curved section is longer than the second curved section, and the second curved section is longer than the first curved section.

10. The multi-tip stylus as claimed in claim 8 wherein the first tip and the second tip form a first tip-combined stroke set;

the first tip and the third tip form a second tip-combined stroke set;

the first tip and the fourth tip form a third tip-combined stroke set;

the first tip and the fifth tip form a fourth tip-combined stroke set;

the second tip and the third tip form a fifth tip-combined stroke set;

the second tip and the fourth tip form a sixth tip-combined stroke set;

the third tip and the fifth tip form a seventh tip-combined stroke set; and the fourth tip and the fifth tip form an eighth tip-combined stroke set.

11. The multi-tip stylus as claimed in claim 9 wherein the first tip and the second tip form a first tip-combined stroke set;

the first tip and the third tip form a second tip-combined stroke set;

the first tip and the fourth tip form a third tip-combined stroke set;

the first tip and the fifth tip form a fourth tip-combined stroke set;

the second tip and the third tip form a fifth tip-combined stroke set;

the second tip and the fourth tip form a sixth tip-combined stroke set;

the third tip and the fifth tip form a seventh tip-combined stroke set; and the fourth tip and the fifth tip form an eighth tip-combined stroke set.

* * * * *